US012600332B2

(12) United States Patent
Harrison

(10) Patent No.: US 12,600,332 B2
(45) Date of Patent: Apr. 14, 2026

---

(54) VEHICLE BRAKING SYSTEM

(71) Applicant: Haldex Brake Products AB, Lanskrona (SE)

(72) Inventor: Dudley John Harrison, Solihull (GB)

(73) Assignee: Haldex Aktiebolag, Landskrona (SE)

( * ) Notice: Subject to any disclaimer, the term of this patent is extended or adjusted under 35 U.S.C. 154(b) by 1073 days.

(21) Appl. No.: 17/614,213

(22) PCT Filed: Apr. 29, 2020

(86) PCT No.: PCT/EP2020/061908
§ 371 (c)(1),
(2) Date: Nov. 24, 2021

(87) PCT Pub. No.: WO2020/239350
PCT Pub. Date: Dec. 3, 2020

(65) Prior Publication Data
US 2022/0219660 A1     Jul. 14, 2022

(30) Foreign Application Priority Data
May 28, 2019    (GB) ..................................... 1907533

(51) Int. Cl.
*B60T 13/68*          (2006.01)
*B60T 8/88*           (2006.01)
*B60T 17/22*          (2006.01)

(52) U.S. Cl.
CPC ............ *B60T 8/885* (2013.01); *B60T 13/683* (2013.01); *B60T 17/221* (2013.01);
(Continued)

(58) Field of Classification Search
CPC ......... B60T 2270/402; B60T 2270/406; B60T 2270/413; B60T 13/683; B60T 17/221; B60T 8/885; B60T 2270/88
See application file for complete search history.

(56) References Cited

U.S. PATENT DOCUMENTS 5,088,042 A * 2/1992 Brearley ............... B60T 8/1766
303/9.62
5,417,477 A * 5/1995 Lasbleis ................. B64C 25/42
303/3
(Continued)

FOREIGN PATENT DOCUMENTS

DE      10215867 A1    11/2003
DE   102006001549 A1    8/2007
(Continued)

OTHER PUBLICATIONS

European Application No. 20723103.6 Examination Report, dated Jan. 11, 2024.
(Continued)

*Primary Examiner* — Bradley T King
(74) *Attorney, Agent, or Firm* — Price Heneveld LLP

(57) ABSTRACT
A vehicle braking system which includes at least one primary feature and at least one redundant feature and a braking control system which is operable to determine whether a predetermined condition, which is not indicative of failure of the primary feature or the redundant feature, is met, wherein if the predetermined condition is met, the braking control system causes the primary feature to be operable and if the predetermined condition is not met, the braking control system causes the redundant feature to be operable.

17 Claims, 1 Drawing Sheet

(52) U.S. Cl.
CPC ... *B60T 2270/402* (2013.01); *B60T 2270/406*
(2013.01); *B60T 2270/413* (2013.01); *B60T*
*2270/88* (2013.01)

(56) References Cited

U.S. PATENT DOCUMENTS

| | | | | |
|---|---|---|---|---|
| 6,410,993 | B1 * | 6/2002 | Giers | B60T 8/321 |
| | | | | 303/20 |
| 10,953,861 | B2 * | 3/2021 | Brüggemann | B64C 25/44 |
| 12,017,623 | B2 * | 6/2024 | Kerby | B60T 15/028 |
| 2010/0222942 | A1 * | 9/2010 | Devlieg | B60T 8/1703 |
| | | | | 701/3 |
| 2012/0299367 | A1 * | 11/2012 | Ross | B60T 8/4872 |
| | | | | 303/3 |
| 2012/0319464 | A1 | 12/2012 | Lloyd | |
| 2015/0057902 | A1 * | 2/2015 | Kanemori | B60T 13/662 |
| | | | | 701/70 |
| 2015/0375720 | A1 * | 12/2015 | Leoka | B60T 13/662 |
| | | | | 303/127 |
| 2016/0263999 | A1 * | 9/2016 | Parga-Cacheiro | |
| | | | | B60L 15/2054 |
| 2016/0339885 | A1 * | 11/2016 | Linhoff | B60T 8/368 |
| 2016/0347296 | A1 * | 12/2016 | Mueller | B60T 10/04 |
| 2018/0099650 | A1 | 4/2018 | Jones et al. | |
| 2019/0039583 | A1 | 2/2019 | Besier et al. | |
| 2019/0071083 | A1 * | 3/2019 | Takahashi | B60W 30/143 |
| 2019/0168728 | A1 * | 6/2019 | Venkatasubramanian | |
| | | | | B60T 13/665 |
| 2019/0263510 | A1 * | 8/2019 | Bill | F16D 66/021 |
| 2019/0283723 | A1 * | 9/2019 | Hitzel | B60T 8/3275 |

| | | | | |
|---|---|---|---|---|
| 2020/0094805 | A1 * | 3/2020 | Riley | B60T 8/1708 |
| 2020/0139948 | A1 * | 5/2020 | Leiber | B60T 13/145 |
| 2021/0276517 | A1 * | 9/2021 | Menke | B60T 8/172 |
| 2021/0354677 | A1 * | 11/2021 | Lee | B60T 13/745 |
| 2022/0048487 | A1 * | 2/2022 | Fischer | B60T 13/66 |
| 2022/0126806 | A1 * | 4/2022 | Leiber | B60T 8/4054 |
| 2022/0166292 | A1 * | 5/2022 | Leiter | H02K 11/33 |
| 2022/0194339 | A1 * | 6/2022 | Tarandek | B60T 13/145 |
| 2022/0212642 | A1 * | 7/2022 | Forghani | B60T 7/042 |
| 2023/0174033 | A1 * | 6/2023 | Lee | B60T 8/1761 |
| | | | | 303/114.1 |

FOREIGN PATENT DOCUMENTS

| | | | |
|---|---|---|---|
| DE | 102017000472 | A1 | 7/2018 |
| DE | 102017121761 | A1 | 3/2019 |
| EP | 3421309 | A1 | 1/2019 |
| GB | 2568773 | A | 5/2019 |
| GB | 2575696 | A | 1/2020 |

OTHER PUBLICATIONS

GB1907533.2 Examination Report, Apr. 3, 2023.
International Search Report for PCT/EP2020/061908 filed on Apr. 29, 2020, 11 pages.
Search Report for GB1907533.2 filed May 28, 2019, Date of search Sep. 30, 2020, 2 pages.
Examination Opinion for GB1907533.2 filed May 28, 2019, Date of report Oct. 1, 2020, 2 pages.
GB1907533.2 Examination Report, Sep. 5, 2023.

* cited by examiner

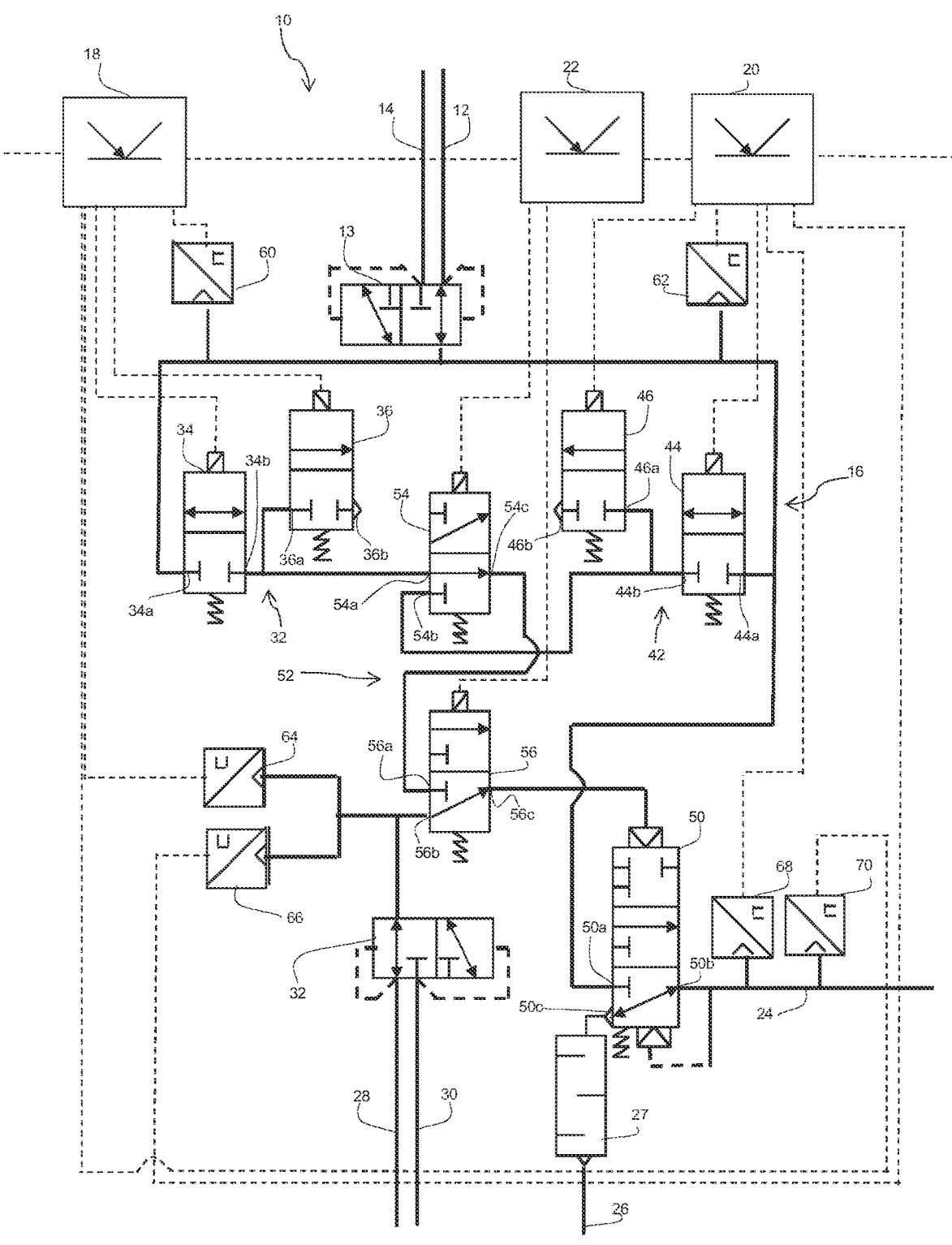

VEHICLE BRAKING SYSTEM

DESCRIPTION OF INVENTION

The present invention relates to a vehicle braking system and method of operation of such a vehicle braking system, in particular, but not limited to a braking system for a truck-trailer combination.

It is known to provide electro-pneumatic vehicle braking systems, which include an electronic control unit for providing electrical signals, for example to indicate a braking demand, to control pneumatic components of the braking system.

It is also known to provide electromagnetic flexure valves for use in fluid control systems such as vehicle braking systems, where fast switching times are required with large pressure differentials across the valve.

Vehicle braking systems typically include a valve assembly known as a modulator which is connected to a source of pressurised fluid, the modulator being used to control and amplify the flow of pressurised fluid to and from a fluid pressure operated brake actuator. The modulator has a supply port which is connected to the source of pressurised fluid, a delivery port which is connected to the brake actuator and an exhaust port which is connected to atmosphere (or any other low pressure volume), and can adopt an apply position, in which fluid is permitted to flow between the supply port and the delivery port of the valve assembly, an exhaust position in which fluid is permitted to flow between the delivery port and the exhaust port, and a hold position in which fluid flow between any two of the supply port, delivery port and exhaust port is substantially prevented.

It is known to provide redundancy of pneumatic components of a braking system, for example providing a redundant valve, for use in the event of failure of the corresponding valve. It is also important for vehicle braking systems to comply with all relevant safety standards and for certain components of vehicle braking systems to have excellent failsafe capability. United Kingdom patent application GB1811936.2 describes a vehicle braking system which includes multiple redundancy and failsafe features. United Kingdom patent application GB1806527.6 describes a valve with a redundancy mode.

An aim of the present invention is to provide improvements in redundancy in a vehicle braking system.

There is provided a method of controlling a vehicle braking system which includes at least one primary feature and at least one redundant feature and a braking control system which is operable to determine whether a predetermined condition, which is not indicative of failure of the primary feature or the redundant feature, is met, wherein if the predetermined condition is met, the braking control system causes the primary feature to be operable and if the predetermined condition is not met, the braking control system causes the redundant feature to be operable.

The redundant feature may not be a substantially identical duplicate of the primary feature.

The predetermined condition may be a predetermined threshold.

The predetermined condition may be a required braking pressure.

The braking control system may monitor for failure of the primary feature and redundant feature and may prevent operation of a failed feature, regardless of whether or not the predetermined condition is met.

The method may include selecting the predetermined condition to be likely to be met in approximately 50% of braking applications.

The method may include monitoring the frequency of use of the redundant feature relative to the use of the primary feature, and the predetermined condition being a predetermined frequency of use of the redundant feature relative to the use of the primary feature.

There is also provided a vehicle braking system including at least one primary feature and at least one redundant feature and a braking control system which is operable to determine whether a predetermined condition, which is not indicative of failure of the primary feature or the redundant feature, is met, wherein if the predetermined condition is met, the braking control system causes the primary feature to be operable and if the predetermined condition is not met, the braking control system causes the redundant feature to be operable.

The vehicle braking system may include a plurality of primary features and a plurality of redundant features.

The predetermined condition may be a required braking pressure.

The braking control system may be operable to determine the frequency of use of the redundant feature relative to the primary feature, and the predetermined condition may be a predetermined relative frequency of the redundant feature relative to the primary feature.

The primary feature may include one or more of the following: an Electronic Control Unit (ECU); a supply line for the supply of pressurised fluid from one or more sources of pressurised fluid; a control valve to control the flow of fluid from a source(s) of pressurised fluid to a modulator; a modulator; one or more internal features of a modulator valve(s); a build valve; a dump valve; a pneumatic control line.

The or each redundant feature may not be a substantially identical duplicate of the primary feature for which it provides redundancy.

The invention will now be described, by way of example only, with reference to the accompanying drawings, of which:

FIG. 1 is a circuit diagram of a part of a vehicle braking system.

It is known to provide "full redundancy", that is if a component or assembly fails in some way, then an alternative means of providing full functionality of the vehicle braking system is provided. In such systems, substantially identical duplicate components and assemblies are provided, such that in the event of a failure of one part of the braking system, its redundant counterpart automatically takes over, to provide full functionality of the braking system. It is also known to provide failsafe features, such that if redundancy is not possible, or if a catastrophic failure occurs, the braking system fails to a "safe" configuration, for example to bring the vehicle to a stop.

Where primary and corresponding redundant components or assemblies are provided, it is possible to use the primary and redundant features alternately, for example a braking system with a redundant modulator valve, or other fluid control components, because they operate in the same way as one another, and the vehicle driver would not experience any change in the functionality of the braking system. Thus, it is possible for the primary component(s) and/or assembly/assemblies to be used for every other brake application, and for the redundant component(s) and/or assembly/assemblies to be used for the intervening braking applications.

The redundant components and/or assemblies may include: Electronic Control Units (ECUs); supply lines for the supply of pressurised fluid from one or more sources of pressurised fluid; control valves which control the flow of fluid from the source(s) of pressurised fluid to a modulator; modulator valves; the internal features of the modulator valve(s); build valves; dump valves; and/or pneumatic control lines, for example.

Part of an exemplary braking system 10 with various redundancy and failsafe features is described in detail below, with reference to FIG. 1.

The vehicle braking assembly 10 may include a first supply line 12, to supply pressurised fluid from one or more sources of pressurised fluid, e.g. a reservoir (not shown), to a control valve assembly 16. The flow of fluid from the supply line 12 may be controlled by a first Electronic Control Unit (ECU) 18, a second ECU 20 and a third ECU 22, each of which is operable to provide control signals to one or more valves of a valve assembly 16, and to communicate with one or both of the other ECUs. The dotted lines in FIG. 1 indicate electrical signal pathways. The configuration of the valve assembly 16 controls the flow of fluid from the or each source of pressurised fluid and/or a first control line 28, to a valve 50 which, controls the flow of pressurised fluid to a delivery line 24, which may be in fluid communication with one or more brake actuators (not shown), and an exhaust 26, which enables pressurised fluid to be vented to atmosphere or a low pressure region.

The valve 50 may be operable as a modulator valve, so as to distribute pressurised fluid as required, dependent upon driver braking demand and/or other conditions, and will hereinafter be referred to as a modulator valve. The modulator valve 50 may be a three position, three port relay valve of the kind known in the art. The modulator valve 50 includes an inlet port 50a, which may be fluidly communicable with the source of pressurised fluid, a delivery port 50b which may be fluidly communicable with a brake actuator (not shown) via the delivery line 24, and an exhaust port 50c. The exhaust port 50c may be fluidly communicable with the exhaust 26 via an exhaust flow path which may include a muffler 27. Fluid communication between the source of pressurised fluid and the modulator valve 50 may be direct (which includes via a shuttle valve). The modulator valve 50 is a fluid actuated valve, and the flow of fluid to actuate the modulator valve 50 is controlled by the valve assembly 16.

In addition to the first supply line 12, there may be provided a second supply line 14 which is fluidly communicable with a source of pressurised fluid (not shown). The source of pressurised fluid to which the second supply line 14 is provided may be the same as that to which the first supply line 12 is connected, or may be a separate source of pressurised fluid. A shuttle valve 13 may be provided to switch between the first and second supply lines 12, 14, such that pressurised fluid is available to the valve assembly 16, even in the event of a failure in one of the supply lines 12, 14.

In addition to the first control line 28, there may be a second control line 30, and a second shuttle valve 31 operable to switch between the first and second control lines 28, 30. This may provide redundancy in the event of a failure in one of the control lines 28, 30.

The vehicle braking system 10 may also include a plurality of transducers, each of which is electronically communicable with at least one of the ECUs 18, 20, 22, to provide an indication of the pressure in a respective fluid flow line, and/or the status of a part of the vehicle braking system 10 with which the transducer is associated.

The valve assembly 16 may include a primary valve assembly 32 and a secondary valve assembly 42. The primary valve assembly 32 may include a primary build valve 34 and a primary dump valve 36 which are fluidly communicable with one another. The secondary assembly 42 may include a secondary build valve 44 and a secondary dump valve 46 which are fluidly communicable with one another. Each of the primary and secondary build valves 34, 44 and the primary and secondary dump valves 36, 46 may be two position, two port valves. The primary build valve 34 may have an inlet 34a and an outlet 34b. The primary dump valve 36 may have an inlet 36a and an outlet 36b. The secondary build valve 44 may have an inlet 44a and outlet 44b. The secondary dump valve 46 may have an inlet 46a and an outlet 46b.

Each of the primary and secondary build valves 34, 44 and the primary and secondary dump valves 36, 46 may be solenoid operated. A first transducer 60 may be associated with a fluid flow path between the source of pressurised fluid (e.g. the supply line 12, 14) and the primary valve assembly 32, and its purpose is to monitor pressure in that fluid flow path, for example to determine whether the primary valve assembly 32 is being supplied with pressurised fluid. The first ECU 18 may be operable to communicate with each of the primary build valve 34 and the primary dump valve 36. The first ECU 18 may also be operable to communicate with the first transducer 60.

A second transducer 62 may be associated with a fluid flow path between the source of pressurised fluid (e.g. the supply line 12, 14) and the secondary control assembly 42, and its purpose is to monitor the pressure in that fluid flow path, for example to determine whether the secondary valve assembly 42 is being supplied with pressurised fluid. The second ECU 20 may be operable to communicate with each of the secondary build valve 44 and the secondary dump valve 46. The second ECU 20 may also be operable to communicate with the second transducer 62.

Each of the primary and secondary build valves 34, 44 may be fluidly communicable with a source of pressurised fluid via the first shuttle valve 13 and the supply lines 12, 14. It will be appreciated that in a configuration where a single supply line is provided, there may be no shuttle valve 13, and each of the build valves 34, 44 may effectively be connected directly to the source of pressurised fluid via the single supply line.

The vehicle braking system may also include a control valve assembly 52. The control valve assembly 52 may include a first control valve 54, and a second control valve 56. In embodiments, the first and second control valves 54, 56 may be two position—three port valves. The first control valve 54 may have a first inlet 54a, which may be fluidly communicable with the outlet 34b of the primary build valve 34, a second inlet 54b, which may be fluidly communicable with the outlet 44b of the second build valve 44 and an outlet 54c which may be fluidly communicable with a first inlet 56a of the second control valve 56. The second control valve 56 may also have a second inlet 56b which is fluidly communicable with the or each control line 28, 30, and an outlet 56c which is fluidly communicable with the modulator valve 50, so as to actuate the modulator valve 50. The first and second control valves 54, 56 may be fluidly communicable with one another. Each of the first and second control valves 54, 56 may be electronically communicable with the third ECU 22.

The first control valve 54 may be fluidly communicable with each of the primary and secondary build valves 34, 44. The second control valve 56 may be fluidly communicable with the modulator valve 50, to provide actuation of the modulator valve 50, for example when the second control valve 56 is open. The second control valve 56 may also be fluidly communicable with the first and/or second control lines 28, 30, for example via the second shuttle valve 31.

A third transducer 64 and a fourth transducer 66 may be provided, each of which is operable to monitor fluid pressure in a fluid flow path between the second control valve 54, 56 and the or each control line 28, 30, for example to monitor whether fluid is flowing between the or each control line 28, 30 and the second control valve 56. The third transducer 64 may be electronically communicable with the first ECU 18 and the fourth transducer 66 may be electronically communicable with the second ECU 20. It will be appreciated that the third and fourth transducers 64, 66 may be replaced by a single transducer, but that providing a pair of transducers 64, 66 provides redundancy, and improved failsafe capability.

A fifth transducer 68 and a sixth transducer 70 may be provided to monitor pressure in the delivery line 24. The fifth transducer 68 may be electronically communicable with the second ECU 20 and the sixth transducer may be electronically communicable with the first ECU 18. The fifth and sixth transducers 68, 70 could be replaced by a single transducer, but the provision of a pair of delivery transducers 68, 70 provides redundancy and improved failsafe capability.

In use, the vehicle braking system 10 is used to actuate one or more brakes (not shown) by controlling the flow of fluid through the modulator valve 50. As mentioned above, the modulator valve 50 is a three-position valve, and each position or configuration of the modulator valve 50 provides for a different 'state' of the vehicle braking system 10. In a first, 'build' position, the modulator valve 50 delivers pressurised fluid to the or each brake via the delivery port 50b. In a second, 'exhaust' condition, the modulator valve vents fluid to the exhaust 26 via the exhaust port 50c, and in a third 'hold' condition, the flow of fluid through the modulator valve 50 is prevented. Actuation of the modulator valve 50 is effected by the supply of pressurised fluid from the second control valve 56 or one of the control lines 28, 30. The default condition is for the actuation of the modulator valve 50 to be effected by the supply of pressurised fluid from the second control valve 56.

Pressurised fluid may be supplied to the second control valve 56 from the source of pressurised fluid via the primary valve assembly 32 or the secondary valve assembly 42. This provides for redundancy in the braking system 10, and enables the brakes to be applied in the event of electrical or pneumatic failure in one of the first and second ECUs 18, 20 and/or the associated communication paths, and/or in one of valves 34, 36, 44, 46 and/or fluid flow lines which supply pressurised fluid to/from any or all of the valves 34, 36, 44, 46, i.e. upstream of the control valve assembly 52.

In order for pressure to build in the braking system 10, at least one of the build valves 34, 44 must be opened. Each build valve 34, 44 may be biased towards a closed configuration. The associated ECU 18, 20 may be operable to provide a signal to the respective build valve 34, 44 to open.

To dump pressurised fluid from the primary or secondary valve assembly 32, 42, the respective dump valve 36, 46 (which may be biased towards a closed position) may be provided with a signal from the respective ECU 18, 20, to open. This provides fluid communication between the source of pressurised fluid and atmosphere or a low pressure area, via an outlet of the respective dump valve 36, 46, which is in fluid communication with an outlet of the respective build valve 34, 44.

When the first build valve 34 is open, fluid communication is possible between the outlet 34b of the first build valve 34 and the first inlet of the first control valve. In order for the primary valve assembly 32 to provide a fluid flow path to the modulator valve 50, the first control valve 54 must be in a first position, in which fluid communication between the first inlet 54a and the outlet 54c of the first control valve is enabled. In this first position of the first control valve 54, fluid communication between the second inlet 54b and the outlet 54c of the first control valve 54 is prevented. The outlet 54c of the first control valve 54 is fluidly communicable with the first inlet 56a of the second control valve, when the second control valve 56 is in a first position. The first position of the second control valve 56 enables fluid flow between the first input 56a and the outlet 56c of the second control valve, to enable control of the modulator valve 50.

The first transducer 60 may be operable to provide an indication of whether the respective build valve 34, is operating as expected and/or as required. In the event of a failure in the primary build valve 34 and/or the fluid flow path between the source of pressurised fluid and the build valve 34, the first transducer 60 may provide an indication to the first ECU 18 that the pressure in the fluid flow path between the source of pressurised fluid and the primary build valve 34 is not as expected. In this event, the first ECU 18 provides an indication to one or both of the other ECUs 20, 22, to indicate that the secondary build valve 44 should be opened. The second ECU 20 may provide a signal to the secondary build valve 44 to open, and the third ECU may provide a signal to place the first control valve 54 in a second position. The third ECU 22 may control the position of the first control valve 54 and the second control valve 56. In the event of a failure of the first ECU 18, one or both of the second and third ECUs may detect such a failure, and enable the secondary valve assembly 42, and place the first control valve 54 in its second position.

When the secondary build valve 44 is open, fluid communication is possible between the outlet 44b of the second build valve 44 and the second inlet 54b of the first control valve 54. In order for the secondary valve assembly 42 to provide a fluid flow path to the modulator valve 50, the first control valve 54 must be in its second position, in which fluid communication between the second inlet 54b and the outlet 54c of the first control valve 54 is enabled. In this second position of the first control valve 54, fluid communication between the first inlet 54a and the outlet 54c of the first control valve 54 is prevented. The outlet 54c of the first control valve 54 is fluidly communicable with the first inlet 56a of the second control valve 56. The first position of the second control valve 56 enables fluid flow between the first inlet 56a and the outlet 56c of the second control valve 56, to enable control of the modulator valve 50.

In the event of a failure in the secondary valve assembly 42 and/or the second ECU 20, the primary valve assembly 32 may be operable, and the first control valve 54 placed in its first position.

The primary valve assembly 32 and the secondary valve assembly 42 may routinely be operated alternately, which can assist in identifying faults which may otherwise remain latent. This method of operation is optional, and one of the primary valve assembly 32 and the secondary valve assembly 42 may be operated as the principal valve assembly unless and until a fault causes the operation of the other of the primary valve assembly 32 and the second valve assembly 42.

In the event that the first and second transducers 60, 62 indicate that neither the first control assembly 32 nor the second control assembly 42 is being supplied with pressurised fluid, then the first and second ECUs 18, 20 may communicate a failure to the third ECU 22. In the event that one or both of the first and second ECUs 18, 20 has failed, then this may be indicated to the third ECU 22, in any event (for example by means of a failed communication between the third ECU 22 and the or each failed one of the first and second ECUs 18, 20).

A failure of both the primary and secondary circuits or upstream of the second control valve 56, causes the third ECU to place the second control valve in its second condition, to enable fluid communication between the second inlet 56b and the outlet 56c of the second control valve, and hence fluid communication between the control line 28, 30 and the modulator valve 50.

The fifth and sixth transducers 68, 70 monitor the pressure in the delivery line 24. In the event of a loss of pressure, for example, when a braking demand is being made, each of the transducers 68, 70 is operable to indicate this event to its respective one of the ECUs 18, 20, and for remedial action to be taken if necessary or desirable. In the event that one of the fifth and sixth transducers 68, 70 fails, the respective ECU 18, 20 is able to communicate this to one or both of the other ECUs 18, 20, 22 such that the configuration of the braking system 10 may be altered if necessary or desirable.

In the event of loss of all electronic communication, the modulator valve 50 may be supplied with pressurised fluid via one of the control lines 28, 30. Each of the third and fourth transducers 64, 66 provides an indication of the pressure in the fluid flow path between the control line 28, 30 and the second control valve 56 to its respective one of the first and second ECUs 18, 20. In the event of failure of one of the third and fourth transducers 64, 66, the respective ECU 18, 20 is able to indicate this failure to at least one of the other ECUs 18, 20, 22, such that the configuration of the braking system 10 may be altered, if necessary or desirable.

The arrangement of the valves and ECUs of the vehicle braking system 10 provides for enhanced redundancy and improved failsafe capability. The braking system 10 has primary and secondary supply circuits, which includes redundancy in both the pneumatic and electronic components of each circuit, including the ECUs 18, 20. The braking system also provides for loss of all electronic communication, through the provision of a fluid actuated modulator, such that all of the components in the system which require an electrical signal or input may be circumvented, to effectively provide a pneumatic override. There are also redundant transducers 64, 66, 68, 70, to improve the failsafe capability, by providing back-up signals which can be acted upon by the respective ECUs 18, 20.

It will be understood that the first, second and third ECUs 18, 20, 22 may be arranged physically separately from one another, or as elements or components of a single ECU. In other words, the physical ECU of a vehicle braking system may have a separate circuit board for each of the first, second and third circuit boards 18, 20, 22, or there may even be a single circuit board, with three independent circuit elements which are communicable with one another as described herein and/or as shown in the accompanying drawing, but which are sufficiently isolated from one another to be able to provide the redundancy features described herein and/or as shown in the accompanying drawing.

It is also possible to provide partial redundancy, for example where an alternative but not necessarily substantially identical component or assembly is utilised in the event of a failure or perceived failure. An example of such a system may be where a wheel modulator fails, control falls back to a redundant axle modulator. This may mean that whilst there may be some difference (even reduction) in functionality or efficacy of the braking system, sufficient braking capability is maintained, and all necessary safety laws and regulations are adhered to. The primary features for which redundancy is provided by an alternative feature may be one or more of the following: an Electronic Control Unit (ECU); a supply line for the supply of pressurised fluid from one or more sources of pressurised fluid; a control valve for controlling the flow of fluid from one or more sources of pressurised fluid to a modulator; a modulator valve; the internal features of a modulator valve; a build valve; a dump valve; and/or pneumatic control lines, for example.

The present invention includes a braking control system which is capable of controlling the operation of the primary and redundant features. The braking control system may include one or more control units operable to indicate and/or control which part or parts of the braking system should be operable at any given moment. The braking control system may be operable to receive an indication of a failure of a primary or redundant feature, for example from a pressure transducer, and to provide such control signals as are required to ensure that the failing feature is not used, and that its corresponding feature is used, instead. Such a redundancy mode may continue for as long as a failure condition is detected. The or each control unit may also have a redundant counterpart or counterparts.

The braking control system may operate the or each redundant feature in accordance with a predetermined condition. The predetermined condition may be a condition other than detected failure of a primary feature or a redundant feature. The predetermined condition may be a predetermined threshold value. For example, one or more redundant features of the braking system may be used in selective braking applications, when the or each predetermined condition is met. For example, if a braking demand is below a predetermined threshold, the redundant feature may be used in preference to the equivalent primary feature. So for example, if it is not necessary to achieve the full level of braking control or functionality, the redundant component may be used without the driver experiencing any noticeable effect and without any detriment to the safety of the vehicle. Whenever the threshold condition is met, then the primary feature is operated, and full functionality/performance is available.

The predetermined condition may be a braking pressure required to meet a braking demand. The braking pressure may be 50 kPa, for example. In such an example, every time the braking demand results in a required braking pressure of less than the predetermined condition (e.g. less than 50 kPa), the redundant feature or features is/are used.

The braking control system still monitors for failures, such that a failed component or assembly is never attempted to be operated, whether or not the predetermined condition is met.

The predetermined condition may be selected to control the frequency of use of the primary feature relative to the frequency of use of the redundant feature. For example, the predetermined condition may be selected to be a condition which statistically is equally likely to occur or not occur, so as to result in the redundant feature being used in approximately 50% of braking applications. Some other frequency may be advantageous, and the predetermined condition may be selected with a view to achieving that particular frequency of use of the redundant feature. The braking control system may be operable such that in the event of a predetermined number of braking applications being made without the redundant feature being operable, the braking control system may cause the redundant feature to be operated on one or more subsequent braking applications, for example the next braking application, regardless of whether the predetermined condition is or is not met. This may apply equally to the operation of the primary feature—i.e. if the primary feature has not been operable for a predetermined number of braking applications as a result of the precondition being met, then the primary feature may be operated on one or more subsequent braking applications, for example the next braking application regardless of whether the predetermined condition is or is not met.

This provides an override for operating the redundant feature in accordance with the predetermined condition.

The braking control system provides increased efficiency—since suitable features are used to meet braking requirements without requirements being "over-met". Furthermore, the redundant features are checked as frequently as is required to meet safety standards—i.e. the predetermined condition may be selected such that it is likely to be met relatively frequently. It may be that the likelihood of the predetermined condition being met on any given braking application is approximately 50%. A further advantage of this system and method is that fewer components need to be duplicated, since partial redundancy may utilise similar but not identical, duplicated features, which may have another purpose within the braking system.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. A method of controlling a vehicle braking system which includes at least one primary feature and at least one redundant feature and a braking control system which is operable to determine whether a predetermined condition is met, wherein if the predetermined condition is met, the braking control system causes the primary feature to be operable and if the predetermined condition is not met, the braking control system causes the redundant feature to be operable, wherein the predetermined condition is a required braking pressure, and is not indicative of failure of the primary feature or the redundant feature, wherein, in the event of a predetermined number of braking applications being made without the redundant feature being operable, the braking control system causes the redundant feature to be operated on the next braking application, regardless of whether the predetermined condition is or is not met.

2. The method according to claim 1, wherein the redundant feature is not a substantially identical duplicate of the primary feature.

3. The method according to claim 1, wherein the braking control system monitors for failure of the primary feature and redundant feature and prevents operation of a failed feature, regardless of whether or not the predetermined condition is met.

4. The method according to claim 1, including selecting the predetermined condition to be likely to be met in approximately 50% of braking applications.

5. The method according to claim 1, including the braking control system monitoring the frequency of use of the redundant feature relative to the use of the primary feature.

6. A vehicle braking system including at least one primary feature and at least one redundant feature and a braking control system which is operable to determine whether a predetermined condition is met, wherein if the predetermined condition is met, the braking control system causes the primary feature to be operable and if the predetermined condition is not met, the braking control system causes the redundant feature to be operable, wherein the predetermined condition is a required braking pressure, and is not indicative of failure of the primary feature or the redundant feature, wherein, in the event of a predetermined number of braking applications being made without the redundant feature being operable, the braking control system causes the redundant feature to be operated on the next braking application, regardless of whether the predetermined condition is or is not met.

7. The vehicle braking system according to claim 6, including a plurality of primary features and a plurality of redundant features.

8. The vehicle braking system according to claim 6, wherein the braking control system is operable to determine the frequency of use of the redundant feature relative to the primary feature.

9. The vehicle braking system according to claim 6, wherein the primary feature includes an Electronic Control Unit (ECU).

10. The vehicle braking system according to claim 6, wherein the or each redundant feature is not a substantially identical duplicate of the primary feature for which it provides redundancy.

11. The vehicle braking system according to claim 6, wherein the primary feature includes a supply line for the supply of pressurised fluid from one or more sources of pressurised fluid.

12. The vehicle braking system according to claim 6, wherein the primary feature includes a control valve to control the flow of fluid from a source(s) of pressurised fluid to a modulator.

13. The vehicle braking system according to claim 6, wherein the primary feature includes a modulator.

14. The vehicle braking system according to claim 6, wherein the primary feature includes one or more internal features of a modulator valve(s).

15. The vehicle braking system according to claim 6, wherein the primary feature includes a build valve.

16. The vehicle braking system according to claim 6, wherein the primary feature includes a dump valve.

17. The vehicle braking system according to claim 6, wherein the primary feature includes a pneumatic control line.

* * * * *